UNITED STATES PATENT OFFICE.

CARL LÜTCKE, JR., OF BERLIN, GERMANY.

EXCITING-FLUID FOR GALVANIC BATTERIES.

SPECIFICATION forming part of Letters Patent No. 474,454, dated May 10, 1892.

Application filed April 17, 1890. Serial No. 348,384. (No specimens.)

*To all whom it may concern:*

Be it known that I, CARL LÜTCKE, Jr., a subject of the King of Prussia, and a resident of Berlin, in the Kingdom of Prussia, Germany, have invented a new and Improved Exciting-Fluid for Galvanic Batteries for Electric Lights; and I do hereby declare the following to be a full, clear, and exact description of the same.

My invention relates to an exciting-fluid for galvanic batteries for electric lights.

It is well known that the inconstancy of a galvanic battery wherein an exciting-fluid prepared from the chlorides of copper, mercury, iron, &c., is employed arises from the circumstance that products of a more or less insoluble character are formed during the chemical decomposition which takes place. These products settle upon the electrodes and cause the electro-motive force rapidly to diminish. The result is that galvanic batteries wherein the usual exciting-fluids are employed have not become generally serviceable for electric lighting without the intervention of accumulators. The exciting-fluid hereinafter described avoids these disadvantages, inasmuch as it considerably prolongs the constancy of the current. Furthermore, a galvanic battery wherein an exciting-fluid prepared in accordance with my invention is employed possesses the advantage of belonging to the "single-fluid" class. In order to obtain these advantages and to secure complete depolarization and constancy of current I employ an exciting-fluid consisting of a concentrated solution of one or several chlorides—such as copper, iron, zinc, &c.—in combination with two or three parts, by weight, of nitrate of mercury. When this mixture is employed, the amalgam remains preserved on the zinc electrode. Moreover, the oxidizing influence of the nitric acid upon the chlorides reduced to chlorine or some other form during the activity of the battery brings about a regeneration of the electrolytic solution.

By the preservation of the amalgam on the zinc electrode an excessive use of the zinc is avoided, and by the above-described method of regeneration the constancy of the battery is longer maintained and deposit on the electrodes avoided. Furthermore, the employment of a single exciting-fluid simplifies the use of the battery and reduces the cost both of preparation and of maintenance.

By reason of the greater constancy of the electric current yielded by a galvanic battery excited as hereinbefore described it is possible to work electric lamps direct with steadiness and for comparatively long periods without employing accumulators.

The above-described effect can also be attained by substituting for the two or three parts, by weight, of nitrate of mercury oxidizing agents, such as hypochlorites, by which oxidizing agents the nascent chlorine (Cl) regenerates the electrolytic solution by bringing back the changed chloride, in French and German chloruce, ($Cu_2Cl_2$) or other chemical products into the original form of the chlorides ($CuCl_2$.)

Having thus fully described my invention, what I claim as new, and desire to secure by Letters Patent, is—

In a galvanic battery, the exciting-fluid consisting of a concentrated solution of one or several chlorides, such as copper, iron, zinc, &c., in combination with from two to three parts, by weight, of nitrate of mercury, substantially as herein described.

In witness whereof I have hereunto set my hand in presence of two witnesses.

CARL LÜTCKE, JR.

Witnesses:
 I. G. UHLENBREICHIR,
 RICH LINDE.